United States Patent [19]
Skinner

[11] Patent Number: 5,327,649
[45] Date of Patent: Jul. 12, 1994

[54] CIRCULAR SAW WITH DUST COLLECTOR

[76] Inventor: Christopher L. Skinner, 3229 W. Milton Ave., St. Louis, Mo. 63114

[21] Appl. No.: 16,542

[22] Filed: Feb. 11, 1993

[51] Int. Cl.$^5$ .................. B26B 1/02; B26B 15/00; B23D 45/16
[52] U.S. Cl. ...................................... 30/124; 30/194; 30/390
[58] Field of Search ............... 30/124, 125, 134, 194, 30/390, 391

[56] References Cited

U.S. PATENT DOCUMENTS

| | | | |
|---|---|---|---|
| 3,882,598 | 5/1975 | Earle et al. | 30/390 |
| 4,063,478 | 12/1977 | Stuy | 83/100 |
| 4,230,005 | 10/1980 | Varga | 83/100 |
| 4,241,505 | 12/1980 | Bodycomb et al. | 30/390 |
| 4,253,362 | 3/1981 | Olson | 83/100 |
| 4,255,995 | 3/1981 | Connor | 83/100 |
| 4,411,067 | 10/1983 | Kirk | 30/124 |
| 4,414,743 | 11/1983 | Pioch et al. | 30/390 |
| 4,675,999 | 6/1987 | Ito et al. | 30/124 |
| 5,046,255 | 9/1991 | Lebreux | 30/390 |
| 5,084,972 | 2/1992 | Waugh | 30/124 |
| 5,146,682 | 9/1992 | Blochle et al. | 30/390 |

Primary Examiner—Richard K. Seidel
Assistant Examiner—Paul M. Heyrana, Sr.
Attorney, Agent, or Firm—Grace J. Fishel

[57] ABSTRACT

A portable circular saw with a dust collector for use in trapping fine dust raised in cutting cultured marble, concrete, masonry and the like has a deflector positioned above a discharge aperture in the front of an upper blade guard for directing the envelope of air moving in the direction of the circular saw blade out the discharge aperture where it is evacuated before it can spread into the workplace environment. The deflector has a slot through which the cutting tip of the circular blade passes.

8 Claims, 2 Drawing Sheets

CIRCULAR SAW WITH DUST COLLECTOR

BACKGROUND OF THE INVENTION

1. Field of the Invention

The present invention-relates to a circular saw with a dust collector which minimizes the amount of dust escaping into the workplace during operation of the saw and which is particularly useful in collecting fine dust as from stone cutting.

2. Brief Description of the Prior Art

Without a dust collector, a portable circular saw generates a lot of dust which may fill the atmosphere surrounding the workplace and represent a health hazard when breathed by the user of the saw and other people in the immediate vicinity. Various vacuum collectors have been proposed for use with portable circular saws.

Dust from stone cutting of cultured marble, concrete, masonry and the like is very fine and because of its fineness spreads easily into the air. In use, a circular saw generates an envelope of air which moves in the same direction as the circular saw blade and carries with it any dust formed by the cutting action of the saw. To prevent the spread of fine dust into the atmosphere, the air envelope carrying the stone dust must be evacuated as soon as the dust is formed. Fine dust is very difficult to collect and insofar as known, prior art vacuum collectors do not specifically address that problem.

SUMMARY OF THE INVENTION

In view of the above, it is an object of the present invention to provide a circular saw with a dust collector which is particularly effective at collecting fine dust as from stone cutting. It is another object to provide a circular saw with a dust collector which evacuates the dust as soon as it is formed and picked up by the envelope of air moving with the circular blade so as to stay its spread into the atmosphere. Other objects and features of the invention will be in part apparent and in part pointed out hereinafter.

In accordance with the invention, a portable saw with a dust collector has a circular blade mounted on a shaft with a motor to rotate the shaft. A motor housing surrounds the motor and the shaft projects through one side of the housing. A base is positioned below the motor housing and is attached to the housing with a part of the circular blade positioned above the base. The circular blade has a cutting tip and creates an envelope of air moving in the same direction as the circular blade. An upper blade guard is attached to the motor housing and substantially encloses that part of the blade positioned above the base. The upper blade guard also has a discharge aperture formed in the front near the base.

The dust collector includes a deflector attached to the front inside of the upper blade guard and angled towards the base. The deflector has a slot through which the tip of the blade passes. The discharge aperture is positioned below the deflector such that the envelope of air moving with the circular blade carrying any dust formed by the cutting action of the circular blade is directed out the discharge aperture. A vacuum source connection means is attached to the upper blade guard in fluid connection with the discharge aperture so that the dust is instantly evacuated as soon as it is formed.

The invention summarized above comprises the constructions hereinafter described, the scope of the invention being indicated by the subjoined claims.

BRIEF DESCRIPTION OF THE DRAWINGS

In the accompanying drawings, in which several of various possible embodiments of the invention are illustrated, corresponding reference characters refer to corresponding parts throughout the several views of the drawings in which.

DETAILED DESCRIPTION OF THE INVENTION

Figure 1:
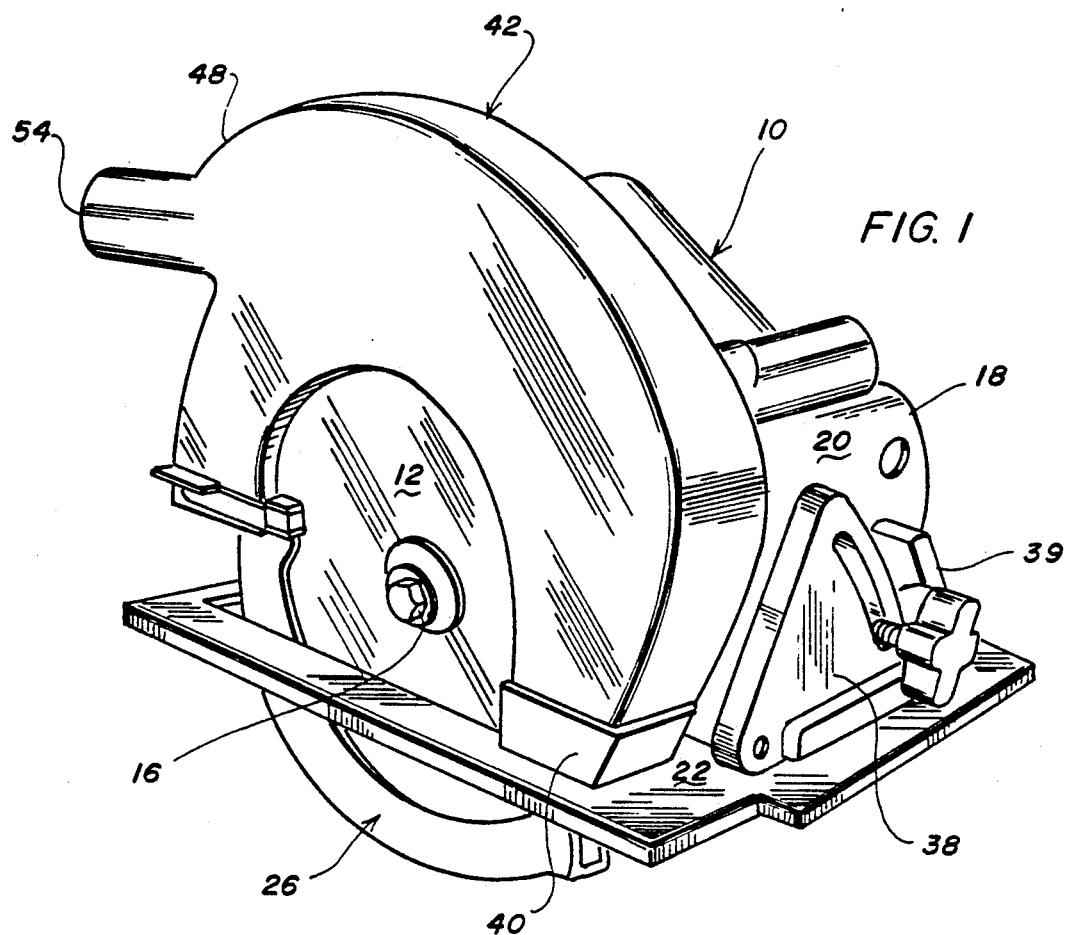
FIG. 1 is a perspective view of a circular saw with a dust collector in accordance with the present invention.
Figure 4:
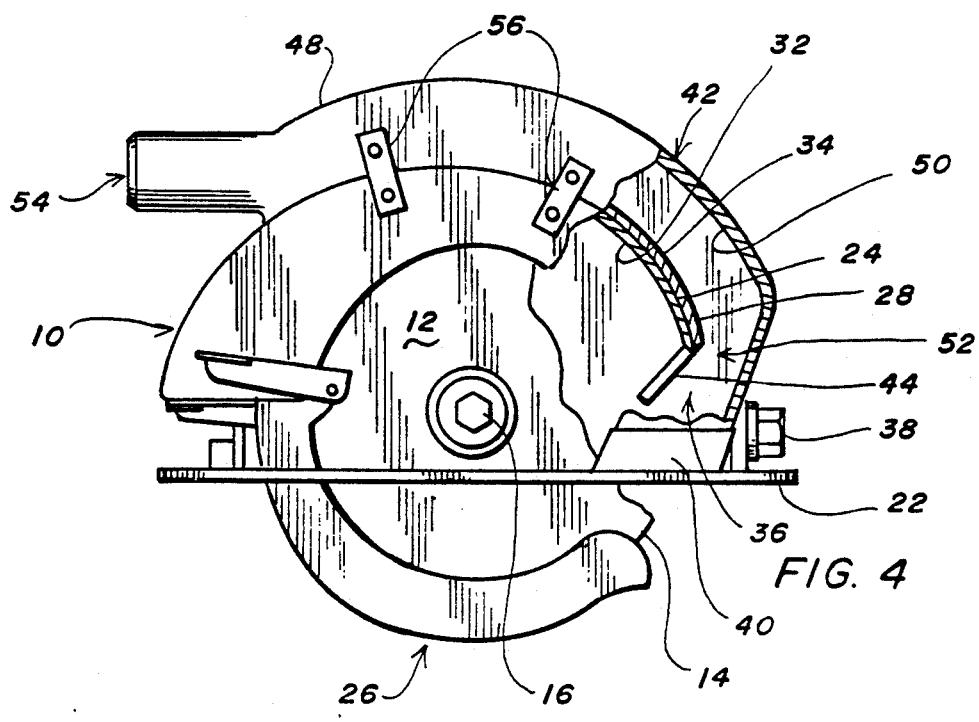
FIG. 4 is a side view with portions partially broken away of a second circular saw with a dust collector in accordance with the present invention.

Referring to the drawings more particularly by reference character, reference numeral 10 refers to a portable circular saw with a dust collector in accordance with the present invention. As shown in FIGS. 1 and 4, saw 10 has a circular blade 12 with a cutting tip 14. Circular blade 12 is mounted on a shaft 16 with a motor 18 to rotate the shaft. Motor 18 is encased in a motor housing 20 through one side of which shaft 16 projects. A base 22 is positioned below and attached to motor housing 20. Circular blade 12 is positioned above base 22 with a part of the blade extending below the base. Cutting is performed by placing a lower face of the base in contact with an object which is to be cut and moving the circular blade against the object.

Figure 2:
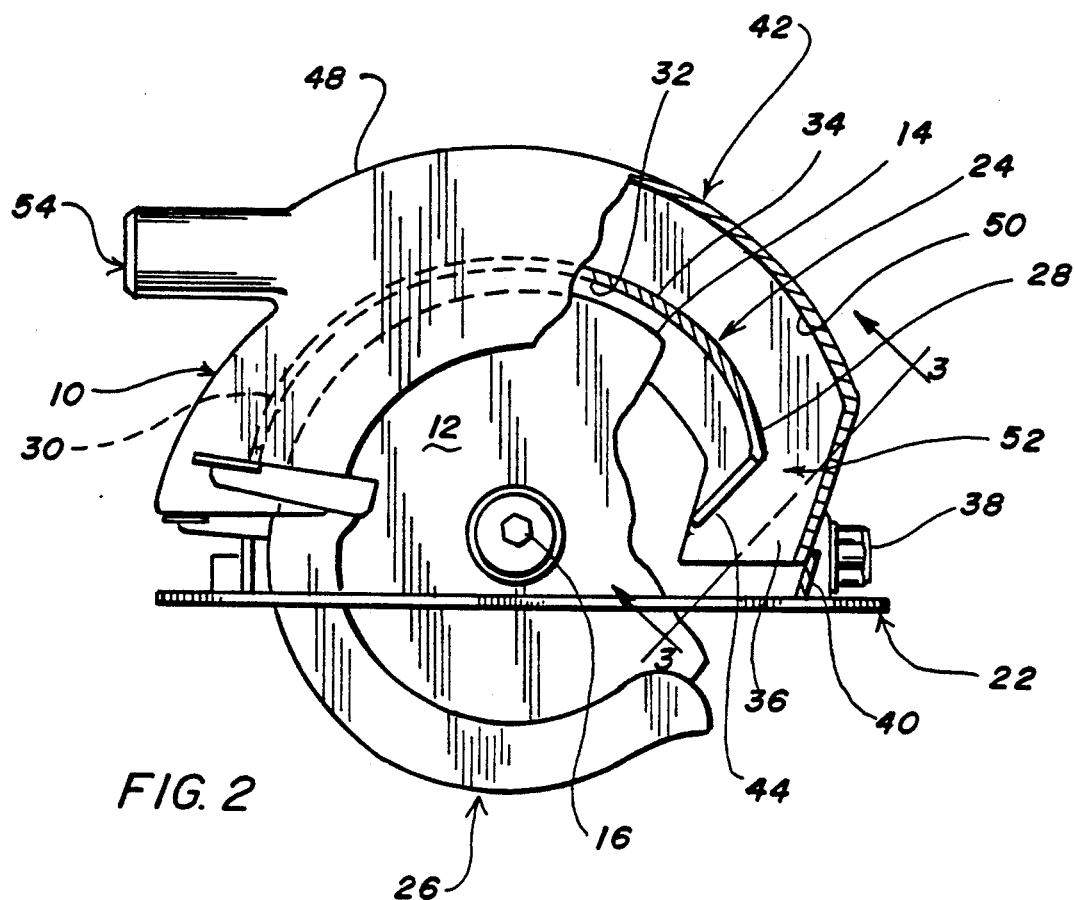
FIG. 2 is a side view with portions partially broken away of the circular saw with a dust collector shown in FIG. 1.

In addition to the features just discussed, saw 10 includes an upper blade guard 24 and a bottom blade guard 26. Upper blade guard 24 is curvilinear in length and substantially U-shaped in cross section. Upper blade guard 24 has a front 28 and a back 30 and an inside 32 and an outside 34. It is fixedly connected .to motor housing 20 and is located around a top outer edged portion of circular blade 12 as best seen in FIGS. 2 and 4. Front 28 and back 30 of upper blade guard 24 are vertically spaced directly above base 22 and a discharge aperture 36 is formed in front 28 near base 22.

Bottom blade guard 26 is also curvilinear in length and substantially U-shaped in cross section and is located around a bottom outer edge portion of circular blade 12. Bottom blade guard 26 is movable along the bottom and side outer edges of circular blade 12. In this regard, bottom blade guard 26 moves up and into upper blade guard 24 as saw 10 cuts through an object.

The term "front" as used in this specification and the following claims refers to the component parts of saw 10 to the right of the axis of rotation of circular blade 12 as seen in FIGS. 1 and 2 (i.e., the side of the saw where the saw blade contacts the material which is being cut). Similarly, the term "back" refers to a position on the opposite side of the axis of rotation of the saw blade as seen in FIGS. 1 and 2 (i.e., the side of the saw where the user is positioned when the saw is being utilized).

Base 22 has a mechanism 38 for adjusting the tilt of circular blade 12 which determine the angle of the cut. Another mechanism 39 may be provided to adjust the depth of the cut that can be made by the saw blade. A flexible flap 40 that is attached to upper blade guard 24 and base 22 channels the dust formed by the cutting action of circular blade 12 into front 28 of upper blade guard 24. Flap 40 is long and/or flexible enough to accommodate changes in the tilt or depth of circular blade 12 and may be transparent to better illuminate the saw cut.

A dust collector 42 comprises a deflector 44 attached to front inside 32 of upper blade guard 24. Deflector 44 substantially fills the inside of upper blade guard 24 and is angled toward base 22. Deflector 44 has slot 46 through which cutting tip 14 passes. Discharge aperture 36 is positioned just below deflector 44 and a vacuum source connection means 48 is attached to upper blade guard 24 in fluid connection with discharge aperture 36.

Figure 3:
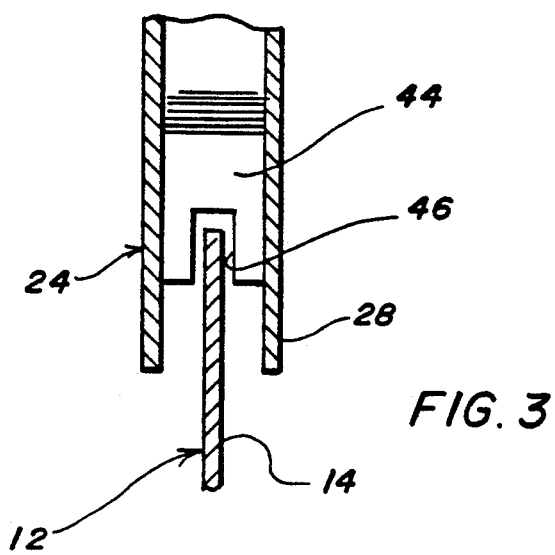
FIG. 3 is a section taken along line 3—3 in FIG. 2.

In the form illustrated in FIGS. 1-3, vacuum source connection means 48 comprises a vacuum conduit 50 that is integrally formed with upper blade guard 24. Conduit 50, like upper blade guard 24, is curvilinear in length and is positioned along outside 34 of upper blade guard 24. Conduit 50 has an inlet 52 at front 28 of upper blade guard 24 and an outlet 54 at back 30. Inlet 52 is in fluid connection with discharge aperture 36 and outlet 54 is in fluid connection with a vacuum source (not shown). While integrally formed vacuum conduit 50 is preferred, vacuum conduit 50 may be separately formed and attached to upper blade guard 24 with suitable fasteners 56 as shown in FIG. 4. Flap 40 is attached to dust collector 42 and more particularly to conduit 50 at inlet 52 to maintain a seal between the collector and base 22 through the range of permitted pivot and tilt movements of saw 10.

In use as circular blade 12 rotates, an envelope of air moves in the same direction as the circular blade. As saw blade 12 penetrates an object being cut, dust formed by the cutting action of circular blade 12 is picked up by the envelope of air. As the envelope of air passes into upper blade guard 24, deflector 44 directs the envelope of air carrying the dust out the discharge aperture whereupon it is immediately evacuated. The instant removal of the dust is particularly important when circular blade 12 is an abrasive blade and the object being cut is cultured marble, concrete, masonry and the like as the dust is very fine.

In view of the above, it will be seen that the several objects of the invention are achieved and other advantageous results attained. As various changes could be made in the above constructions without departing from the scope of the invention, it is intended that all matter contained in the above description or shown in the accompanying drawings shall be interpreted as illustrative and not in a limiting sense.

What is claimed is:

1. A portable circular saw with a dust collector, said circular saw having a circular blade mounted on a shaft, a motor to rotate the shaft, a motor housing surrounding said motor and through one side of which said shaft projects, a base positioned below the motor housing and attached thereto, said circular blade having a cutting tip and creating an envelope of air moving in the same direction as the circular blade with a part of the circular blade being positioned above said base, an upper blade guard having a front and a back and an inside and an outside, said upper blade guard attached to the motor housing and substantially enclosing said part of the blade positioned above the base, said upper blade guard having a discharge aperture formed in the front thereof, said dust collector comprising a deflector attached to the front inside of the upper blade guard and angled towards the base, said deflector substantially filling the space inside the front of the upper blade guard and having a slot which straddles the cutting tip and through which the tip of the blade passes, said discharge aperture positioned below the deflector such that the envelope of air moving with the circular blade carrying any dust formed by the cutting action of the circular blade is directed out the discharge aperture into a vacuum source connection means attached to said upper blade guard in fluid connection with said discharge aperture.

2. The portable circular saw with a dust collector of claim 1 wherein the circular blade is an abrasive blade for cutting cultured marble, concrete, masonry and the like.

3. The portable circular saw with a dust collector of claim 1 wherein a flexible flap is attached to the dust collector and the base to channel the dust formed by the cutting action of the circular blade into the front of the upper blade guard.

4. A portable circular saw with a dust collector, said circular saw having a circular blade mounted on a shaft, a motor to rotate the shaft, a motor housing surrounding said motor and through one side of which said shaft projects, a base positioned below the motor housing and attached thereto, said circular blade having a cutting tip and creating an envelope of air moving in the same direction as the circular blade with a part of the circular blade being positioned above said base, an upper blade guard having a front and a back and an inside and an outside, said upper blade guard attached to the motor housing and substantially enclosing said part of the blade positioned above the base, said upper blade guard having a discharge aperture formed in the front thereof, said dust collector comprising a deflector attached to the front inside of the upper blade guard and angled towards the base, said deflector substantially filling the space inside the front of the upper blade guard and having a slot which straddles the cutting tip and through which the tip of the blade passes, said discharge aperture positioned below the deflector such that the envelope of air moving with the circular blade carrying any dust formed by the cutting action of the circular blade is directed out the discharge aperture, and a vacuum conduit formed along the outside of the blade guard, said conduit having an outlet at the rear of the blade guard and an inlet at the front of the blade guard, said inlet in fluid connection with said discharge aperture and said outlet in fluid connection with a vacuum source connection means.

5. The portable circular saw with a dust collector of claim 4 wherein the conduit is integrally formed with the upper blade guard.

6. The portable circular saw with a dust collector of claim 5 wherein the circular blade is an abrasive blade for cutting cultured marble, concrete, masonry and the like.

7. The portable circular saw with a dust collector of claim 6 wherein a flexible flap is attached to the dust collector and the base to channel the dust formed by the cutting action of the circular blade into the front of the upper blade guard.

8. The portable circular saw with a dust collector of claim 7 wherein the flexible flap is transparent.

* * * * *